Nov. 4, 1958　　　D. A. GOLDMAN　　　2,858,981

VECTOR SUMMER

Original Filed Aug. 24, 1956

INVENTOR
DAVID A. GOLDMAN

BY

ATTORNEYS

United States Patent Office 2,858,981
Patented Nov. 4, 1958

2,858,981

VECTOR SUMMER

David A. Goldman, Yorktown Heights, N. Y.

Original application August 24, 1956, Serial No. 606,173. Divided and this application August 14, 1957, Serial No. 678,254

3 Claims. (Cl. 235—61)

(Granted under Title 35, U. S. Code (1952), sec. 266)

The invention described herein may be manufactured and used by or for the Government of the United States of America for governmental purposes without the payment of any royalties thereon or therefor.

This application is a division of copending application Serial No. 606,173, filed August 24, 1956, for Vector Summer.

The present invention relates to a vector summer for providing an indication of the angle and magnitude of the resultant vector of the sum of a plurality of vectors.

Planar vectors can be represented in polar form by the quantity $Ae^{ja}$; wherein A is the magnitude of the vector, $e$ is the base for Napierian logarithms, $j$ is the square root of minus one, and $a$ is the angle of the vector. Thus, the sum of a plurality of vectors (a first of which has a magnitude A and an angle $a$, the second of which has a magnitude B and an angle $b$, the third of which has a magnitude C and an angle $c$, etc.) is:

$$Ae^{ja}+Be^{jb}+Ce^{jc}+ \ldots =\rho e^{j\theta}$$

in which $\rho$ is the magnitude of the resultant vector and $\theta$ is the angle of this vector with respect to the axis from which angles $a$, $b$, $c$, etc., are determined. If the reference axis is rotated by $\theta$ degrees so that the resultant vector is coincident with this axis, then $\theta$ degrees must be subtracted from all of the angles of the vectors in the above equation. This yields:

$$Ae^{j(a-\theta)}+Be^{j(b-\theta)}+Ce^{j(c-\theta)}+ \ldots =\rho$$

This is true since $e^{j(\theta-\theta)}=1$. Converting this polar form equation into rectangular form and separating out the real and imaginary components produces two equations:

$$j^A \sin (a-\theta)+j^B \sin (b-\theta)+j^C \sin (c-\theta)+ \ldots =0$$

$$A \cos (a-\theta)+B \cos (b-\theta)+C \cos (c-\theta)+ \ldots =\rho$$

These two equations are correct since in the preceding polar form equation, the real components on the left side of the equation must be equal to the real components on the right side of the equation, and also the imaginary components on both sides must be equal. Dividing both sides of the imaginary rectangular form equation by $j$ gives:

$$A \sin (a-\theta)+B \sin (b-\theta)+C \sin (c-\theta)+ \ldots =0$$

The present invention solves the last two cosine-sine equations to provide in a preferred embodiment a mechanical shaft displacement equal to the angle ($\theta$) of the resultant vector and a voltage proportional to the resultant vector magnitude ($\rho$).

Accordingly, an object of the present invention is the provision of a vector summer for producing one output that is proportional to the resultant of the sum of a plurality of planar vectors and for producing another output that is equal to the angle of this resultant.

Another object is the provision of a vector summer for producing a voltage that is proportional to the resultant of the sum of a plurality of planar vectors and for producing a shaft angular displacement that is equal to the angle of this resultant.

A further object of the present invention is to provide a system which produces an angular displacement in a shaft that is equal to the angle of the resultant of a sum of vectors.

Still another object of the present invention is the provision of a system for producing a voltage that is proportional to the amplitude of a vector that is the resultant of the sum of a plurality of vectors.

Other objects and many of the attendant advantages of this invention will be readily appreciated as the same becomes better understood by reference to the following detailed description when considered in connection with the accompanying drawings wherein.

Figure 1:
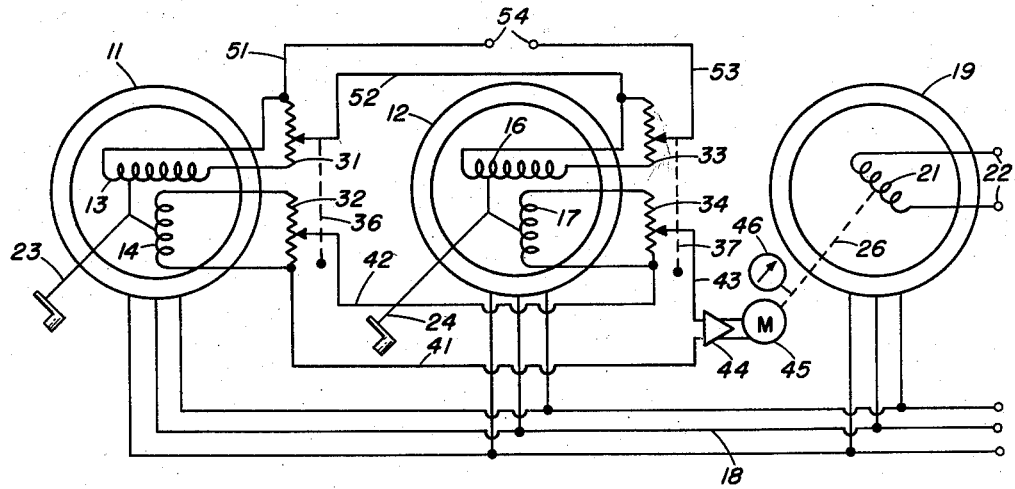
Fig. 1 shows a circuit diagram of a preferred embodiment of the invention.

Referring now to the drawings, wherein like reference characters designate like or corresponding parts throughout the several figures, there is shown in Fig. 1 (which illustrates a preferred embodiment) two synchro control resolver receivers 11 and 12 having orthogonally positioned pairs of rotary windings 13, 14 and 16, 17, respectively. These receivers have stationary windings (not shown) that are interconnected by wires 18 and which are connected also to the stationary windings of synchro control transmitter 19. Transmitter 19 has a rotary winding 21 that is joined to terminals 22 for connection to a source of A. C. voltage. Each of the rotors of these synchro elements have rotating means: In receivers 11 and 12 this rotating means comprises manual rotating elements 23 and 24, respectively, and in transmitter 19 it is a mechanical shaft 26 which is adapted to be rotated by a motor. In order that a controllable percentage of voltage can be obtained from the windings of rotor receivers 11 and 12, potentiometers 31, 32, 33, and 34 are joined across rotor windings 13, 14, 16, and 17, respectively. The arms of potentiometers 31 and 32 are mechanically linked by some suitable means such as shaft 36, which is constructed of a nonconducting material, in a manner such that the potentiometer arms tap off the same percentage of voltage. Shaft 37 works in a similar fashion for rotor windings 16 and 17 of receiver 12. Leads 41, 42, and 43 join the outputs of potentiometers 32 and 34 in series to the input of amplifier 44. The output of this amplifier energizes motor 45 which has an armature joined to shaft 26 for driving the rotor of transmitter 19. If desired, a meter such as meter 46 can be mounted on or connected to shaft 26 to indicate the angular position of this shaft. Other leads 51, 52, and 53 connect in series the outputs of potentiometers 31 and 33 to output terminals 54.

All of the components of the Fig. 1 embodiment are well known in the art and require no explanation with perhaps the exception of synchro control receivers 11 and 12 and synchro control transmitter 19. These synchro elements have a combined function that can best be described as a transformer function since they transform the voltage applied at input terminals 22 to voltages on rotor windings 13, 14, 16, and 17, that are functions of the angular displacement of the rotors of these synchro elements. That is, the voltages generated in windings 13 and 14 are a function of the displacements of the rotors of transmitter 19 and receiver 11; and the voltages generated in windings 16 and 17 are a function of the displacements of the rotors of transmitter 19 and receiver 12. Also, as a result of their orthogonal relationship, it can be shown that the voltages generated in the orthogonally displaced windings 13, 14, and 16, 17 have a relation to each other as does the sine of an angle to the cosine of the same angle. The significance of these voltage relationships is mentioned below in the operational discussion of the Fig. 1 embodiment.

Figure 2:
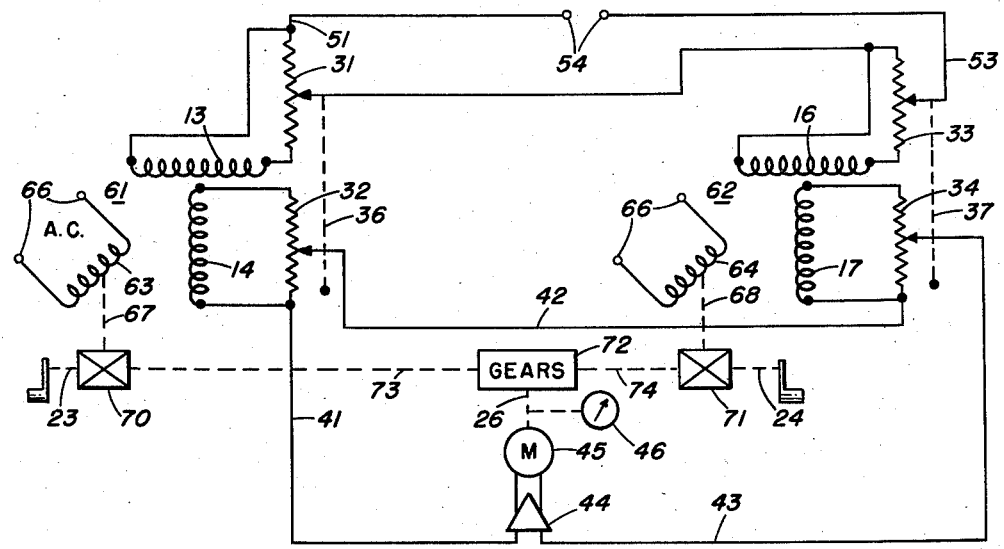
Fig. 2 illustrates a circuit diagram of another embodiment of the invention.

The embodiment of the invention shown in Fig. 2 contains many elements that are identical to the elements of the Fig. 1 embodiment, but there are differences and these are mainly centered around the use of a mechanical differential in lieu of a synchro combination. The components of Figs. 1 and 2 having the same designating numerals are identical with the exception that windings 13, 14, 16, and 17 of the Fig. 2 embodiment are stationary windings of electrical resolvers and the windings of the Fig. 1 embodiment having these numerals are rotor windings of synchro receivers. These windings have been given the same numerals since the voltages generated in these windings are the same in both embodiments. In the Fig. 2 embodiment, resolvers 61 and 62, which are shown only in circuit diagram form, have rotor windings 63 and 64, respectively, which are joined to input terminals 66 for energization from an A. C. line. These windings 63 and 64 are mounted on rotors (not shown) that are connected by shafts 67 and 68, respectively, to the outputs of differentials 70 and 71, respectively. The magnitude of the voltages generated in stationary windings 13 and 14 of resolver 61 are functions of the position of the rotor upon which rotor winding 63 is mounted. Thus, as shaft 67 is rotated the voltages generated in windings 13 and 14 vary as a function of the position of shaft 67. Windings 13 and 14 are orthogonally positioned with respect to one another and thus have the same sine-cosine relationship as do windings 13 and 14 of receiver 11 of the Fig. 1 embodiment. The voltages generated in windings 16 and 17 of resolver 62 depend in a similar manner upon the output of differential 71. Gears 72 couple shafts 73 and 74 to shaft 26 in a one-to-one relationship so that all three shafts rotate in synchronism. Also, differential 70 displaces output shaft 67 by an amount that is equal to the difference in displacements of input shaft 73 and manual shaft 23, and differential 71 displaces output shaft 68 by an amount that is equal to the difference in displacements of input shaft 74 and manual shaft 24. As previously explained, the remainder of the components of the Fig. 2 embodiment function in the same manner as the corresponding components of the Fig. 1 embodiment.

The present invention should not be construed as limited to the showings of Figs. 1 and 2. For example, in Fig. 1 only two synchro receivers are shown, and as will be explained below, only two vectors could be added with this system. It should be apparent that any number of receivers can be connected in the manner that receivers 11 and 12 are shown connected and thus any number of vectors can be added. The same is true of the number of resolvers in Fig. 2. Also, alternate systems can be made with sine-cosine potentiometers, and variable excitation voltage sources can be employed instead of potentiometers. In addition, combinations of synchro receivers, resolvers, and potentiometers can be made.

In the operation of the Fig. 1 embodiment, a different synchro control resolver receiver is associated with each vector of the group of vectors that are to be added. For the sake of simplicity, assume that two vectors $Ae^{ja}$ and $Be^{jb}$ are to be added and that vector $Ae^{ja}$ is associated with receiver 11 and that vector $Be^{jb}$ is associated with receiver 12. Only two adjustments are required for each vector: the rotor of the receiver associated with the vector is rotated through the angle of the vector, and the arms of the potentiometers connected to the receiver are moved to a position corresponding to the amplitude of the vector. Thus, for receiver 11, manual arm 23 is rotated through an angle $a$ and arm 36 is moved to a position corresponding to amplitude A, and for receiver 12, manual arm 24 is rotated through an angle $b$ and arm 37 is moved to a position corresponding to amplitude B. Of course, each of the receiver rotors must be initially in a reference position; e. g., the positions wherein no voltage is generated in windings 14 and 17. Also, the voltage obtained from potentiometer 32 must be the same percentage of amplitude A as the voltage obtained from potentiometer 37 is of B. This same relationship is true for the voltages tapped off from potentiometers 31 and 33. After the positioning of the rotors and the moving of the potentiometer arms, winding 21 is connected by a switch or the like (not shown) to be energized by an A. C. source. The armature of motor 45 then rotates rotor winding 21 until the input to amplifier 44 is zero, for then the input to motor 45 will also be zero. The amount of angular displacement of the armature of motor 45 and thus also the displacement of shaft 26 as measured by meter 46 during this operation is equal to the angle $\theta$ which is the angle of the vector resultant of the sum of the vectors $Ae^{ja}$ and $Be^{jb}$. This is evident from the fact that the input to amplifier 44 is:

$$KA \sin (a-k) + KB \sin (b-k)$$

in which K is the proportionality constant of potentiometers 32 and 34 and $k$ is the phase displacement angle produced in the voltages generated in the rotor windings of receivers 11 and 12 by the displacement of rotor winding 21 of transmitter 19. Due to the inherent characteristics of synchro elements, the angle $k$ is exactly the angle through which winding 21 is displaced.

When motor 45 stops rotating this input to amplifier 44 must be zero:

$$KA \sin (a-k) + KB \sin (b-k) = 0$$

or $$A \sin (a-k) + B \sin (b-k) = 0$$

But as was previously derived:

$$A \sin (a-\theta) + B \sin (b-\theta) = 0$$

Therefore, $k$ must equal $\theta$, which is the angle of the resultant vector and also the angle through which rotor winding 21 is rotated by shaft 26. Thus, the angular reading of meter 46 is the angle of the resultant vector. Since it has been determined that $k$ equals $\theta$, then the output of winding 12 as tapped off from potentiometer 31 is $KA \cos (a-\theta)$ and the output of winding 16 as tapped off from potentiometer 33 is $KB \cos (b-\theta)$. The sum of these two outputs which is obtained at terminals 54 is $KA \cos (a-\theta) + KB \cos (b-\theta)$. It has been previously derived that $A \cos (a-\theta) + B \cos (b-\theta) = p$. Therefore it is seen that the output obtained from terminals 54 is proportional to the magnitude of the resultant vector.

It has been shown in the foregoing discussion that the circuit of Fig. 1 provides a shaft displacement of shaft 26 that is equal to the angle of the resultant vector of the sum of a plurality of vectors and the voltage produced at the output terminals 54 is proportional to the magnitude of this resultant vector. As previously explained, if there are more than two vectors to be added of course more than two receivers are required since a single receiver is required for every vector, but the addition of receivers entails no difficulty since they are connected in the identical manner as receivers 11 and 12 of Fig. 1.

The embodiment shown in Fig. 2 works basically the same as that shown in Fig. 1 and produces the same output. In Fig. 2, an individual electrical resolver is required for each vector that is to be summed, but to simplify the explanation only two resolvers 61 and 62 are shown. Assuming that the two vectors to be added are $Ae^{ja}$ and $Be^{jb}$, then to obtain the resultant vector in resolver 61, arm 23 is rotated until the angular displacement of this arm is equal to the angle $a$, and arm 36 is moved to a position corresponding to amplitude A. In resolver 62 arm 24 is rotated through the angle $b$ and arm 37 is moved to a position corresponding to amplitude B. The armature of motor 45 then rotates shaft 26 and thus shafts 73 and 74 until the input to this motor is zero. The amount of angular displacement of shaft 26 as measured by meter 46 at the end of this operation is equal to the angle $\theta$ which is the angle of the vector resultant of the sum of the vectors $Ae^{ja}$ and $Be^{jb}$.

This last statement can be proved as follows: It is known that the amplitude of the voltage signal generated in winding 14 is the sine of the angle of the displacement of winding 63. The displacement of this winding is the difference in angular displacements of the shafts feeding differential 70; i. e., $a-k$. As previously mentioned, $a$ is the angular displacement of shaft 23 and $k$ is the angular displacement of shaft 73 which is the same as the displacement of shaft 26. So, the output from potentiometer 32 is $KA \sin (a-k)$ wherein K is proportionality constant of potentiometer 32. It can be similarly shown that the output from potentiometer 34 is $$KB \sin (b-k)$$

Thus, the input to amplifier 44 is $$KA \sin (a-k) + KB \sin (b-k)$$

When motor 45 stops rotating this input to amplifier 44 is zero since the input to motor 45 is the output of amplifier 44 which is a multiple of its input. At that time then:

$$KA \sin (a-k) + KB \sin (b-k) = 0$$

And as shown in the discussion of Fig. 1, then $k$ must be equal to $\theta$. Since the voltage generated in winding 13 and in winding 16 is the cosine of the angular displacement of windings 63 and 64, respectively, the voltage appearing at the output terminals 54 is proportional to the amplitude of the resultant vector as explained in the discussion of Fig. 1.

To sum up, a vector summer has been disclosed for providing a first output which is proportional to the magnitude of the resultant vector of the sum of a plurality of vectors and a second output that is equal to the angle of this resultant vector. Two embodiments were shown and in each the angular displacement of a shaft output is made equal to the angle of the resultant vector and the magnitude of a voltage output is made proportional to the amplitude of this vector. Although both of these embodiments provide information as to the angle and amplitude of the resultant vector, it is to be realized that if only one of these quantities is desired these embodiments can be made simpler in a manner obvious to one skilled in the art.

Obviously many modifications and variations of the present invention are possible in the light of the above teachings. It is therefore to be understood that within the scope of the appended claims the invention may be practiced otherwise than as specifically described.

What is claimed is:

1. A system for providing a mechanical shaft displacement that is equal to the angle of the resultant vector of the sum of a plurality of vectors and for providing a voltage proportional to the magnitude of said resultant vector, said system comprising: a plurality of synchro control resolver receivers each corresponding to one of the vectors that is to be summed, each of said receivers having two rotor windings positioned 90° with respect to each other; a synchro control transmitter; leads interconnecting the stationary windings of said resolver receivers and the stationary windings of said synchro control transmitter; a plurality of potentiometers equal to the number of said rotor windings and each of which is connected across a different rotor winding; a plurality of electrically insulated links a different one of which joins the potentiometer arms of the two potentiometers connected to the rotor windings of each of said synchro control resolver receivers; leads for series connecting one potentiometer from each synchro receiver; a motor having a shaft output joined to the rotor of said synchro control transmitter; an amplifier for amplifying the voltages obtained from said series connected potentiometers; leads for connecting the output of said amplifier to the input of said motor; and leads for connecting the potentiometers associated with said receivers other than said series connected potentiometers in series.

2. The system of claim 1 and a meter for indicating the angular position of the shaft of said motor.

3. A vector summer comprising: a plurality of synchro control resolver receivers, each of which has two rotor windings mounted 90° with respect to each other; a synchro control transmitter; leads interconnecting the stationary windings of said synchro control resolver receivers and said synchro control transmitter; means for individually rotating the rotor of each of said synchro control resolver receivers; selector means for obtaining a portion of the voltage generated in each of said rotor windings, the voltage obtainable from the two windings of each resolver always being in the same proportion; means for producing a voltage that is the amplified sum of the voltage which is obtained from said selector means from one winding of each of said synchro control resolver receivers; a motor having a shaft connected to the rotor of said synchro control transmitter; leads for connecting said sum voltage to the input of said motor; and means for obtaining the sum of the proportion voltages from the windings of said resolver other than said one windings.

References Cited in the file of this patent
UNITED STATES PATENTS

| | | |
|---|---|---|
| 2,382,994 | Holden | Aug. 21, 1945 |
| 2,754,055 | Naylor | July 10, 1956 |
| 2,783,941 | Naylor | Mar. 5, 1957 |